United States Patent

[11] 3,604,185

[72] Inventors Walter E. Reber;
 Adrien J. Formery; Wilhelmus H. Van den Heuvel, all of Saverne, France
[21] Appl. No. 776,606
[22] Filed Nov. 18, 1968
[45] Patented Sept. 14, 1971
[73] Assignee Kuhn Freres & Cie
 Paris, France
[32] Priority Dec. 22, 1967
[33] France
[31] 133.567

[54] MECHANISMS FOR DRIVING THE CUTTER ELEMENTS OF A ROTARY MOWING MACHINE
 7 Claims, 7 Drawing Figs.
[52] U.S. Cl. .................................................... 56/12.7,
 56/6, 56/13.7
[51] Int. Cl. ..................................................... A01d 35/26
[50] Field of Search ........................................... 56/6, 25.4,
 503, 192, 295, 235

[56] References Cited
UNITED STATES PATENTS

| | | | |
|---|---|---|---|
| 2,625,784 | 1/1953 | Kelsey ........................... | 56/192 |
| 2,690,040 | 9/1954 | Miller et al. ................... | 56/6 |
| 2,986,864 | 6/1961 | Young ............................ | 56/503 |
| 3,469,378 | 9/1969 | Heesters et al. ............... | 56/25.4 |

Primary Examiner—Russell R. Kinsey
Attorney—Stevens, Davis, Miller & Mosher

ABSTRACT: Device for driving the cutter elements of a rotary mowing machine comprising a main bar consisting of a case made of two halves or sections assembled, the upper section having secured thereto the mowing machine driving member and the bearing blocks of the spindles of the pinions driving the discs supporting said cutter elements, and of toothed intermediate wheels of said transmission, characterized in that the bearing blocks or supports of at least two intermediate wheels disposed between two driving pinions are reinforced by a flat bridge piece rigidly secured to, and interconnecting, the lower ends of said bearing blocks, said bridge piece being thus adapted to rigidly assemble the fastening studs of said bearing blocks.

PATENTED SEP 14 1971

INVENTORS
WALTER E. REBER
ADRIEN J. FORMERY
WILHELMUS H. VANDEN HEUVEL

By Stevens, Davis, Miller & Mosher
ATTORNEYS

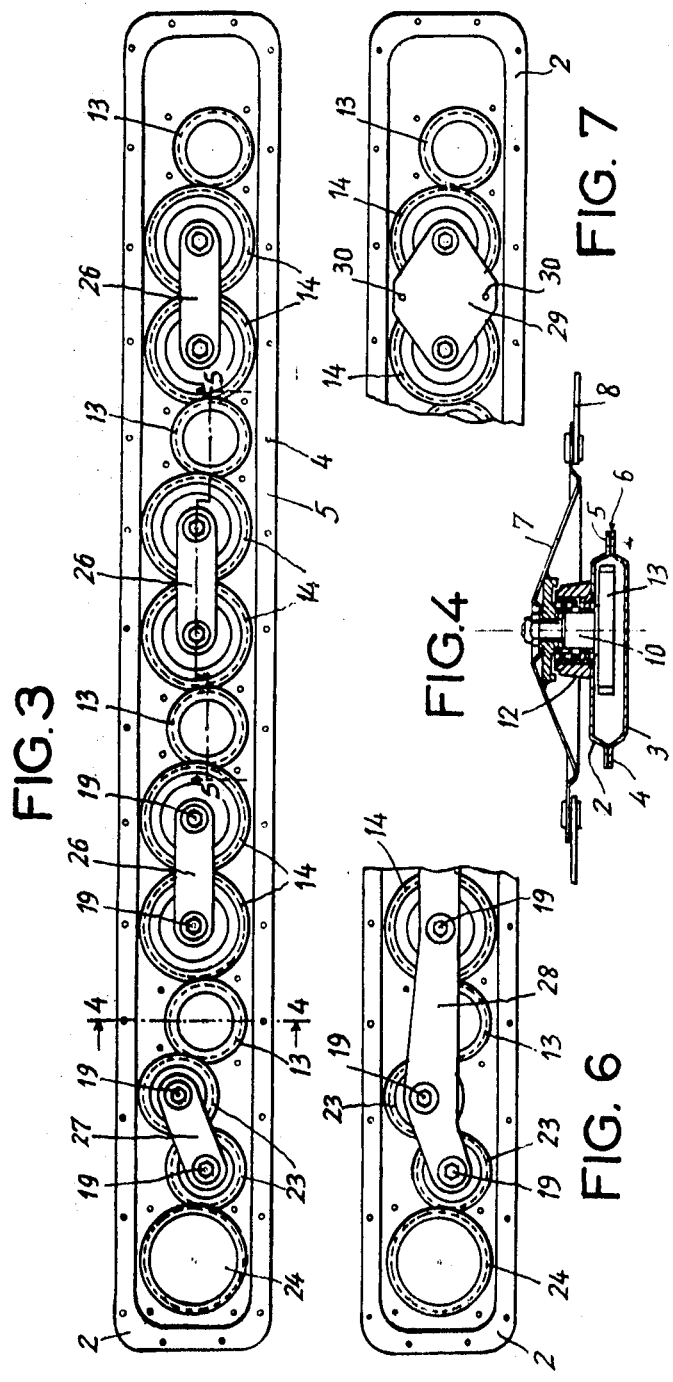

MECHANISMS FOR DRIVING THE CUTTER ELEMENTS OF A ROTARY MOWING MACHINE

This invention relates to a device for imparting a rotary motion to the cutter elements of a rotary mowing machine.

Rotary mowing machines equipped with cutter elements carried by discs are already known wherein said discs are driven with a circular motion synchronized by an endless chain, gear or belt transmission mounted and enclosed in the main bar consisting of a closed case consisting of two similar shells, sections or halves. As a rule, all the driving members are mounted on a single and the same wall of this case, notably the upper wall acting as a support to the bearing blocks of the cutter elements supporting disc control spindles and to the transmission driving member.

This kind of assembling is advantageous in that it facilitates machining, mounting and control of the driving system of a rotary moving machine while permitting using a simpler element for constituting the lower portion of the case which is exposed to wear and tear from the ground, without requiring accurate or strict machining and pairing tolerances, so that this lower element is relatively economical and easily interchangeable. Moreover, as the lower wall of the case is free of bores for guiding the spindles, gears or wheels, the fluid tightness of the case is easier to achieve.

However, under certain service conditions, mounting of the spindles of the intermediate wheels or gears only in the upper section of the case may prove hazardous. According to a known construction, the spindles may be caused to bear on both case sections, but this solution is objectionable in that the advantages set forth hereinabove are lost.

It is the object of the present invention to provide a device for reinforcing the transmission, notably of the intermediate spindles and gears, whereby the inconveniences mentioned hereinabove can be avoided.

This device is characterized in that the bearings of at least two intermediate gears between two disc-driving pinions are reinforced by a flat bridge piece rigid with the lower ends of said bearing blocks so as to assemble them, this bridge piece also rigidly assembling the fastening pins of these bearings with each other.

The advantages and features characterizing the device of this invention will appear more clearly as the following description proceeds with reference to the accompanying drawing illustrating diagrammatically a typical form of embodiment of the invention, given by way of example. In the drawing:

FIG. 3 shows in plan view the inside of the upper portion of the main bar with a device according to this invention for reinforcing the transmission mechanism;

FIG. 4 is a cross section taken along the line 4—4 of FIG. 3, showing details on a larger scale;

FIGS. 6 and 7 are detail views showing modified forms of embodiment of the transmission reinforcement means of this invention.

Figure 1:
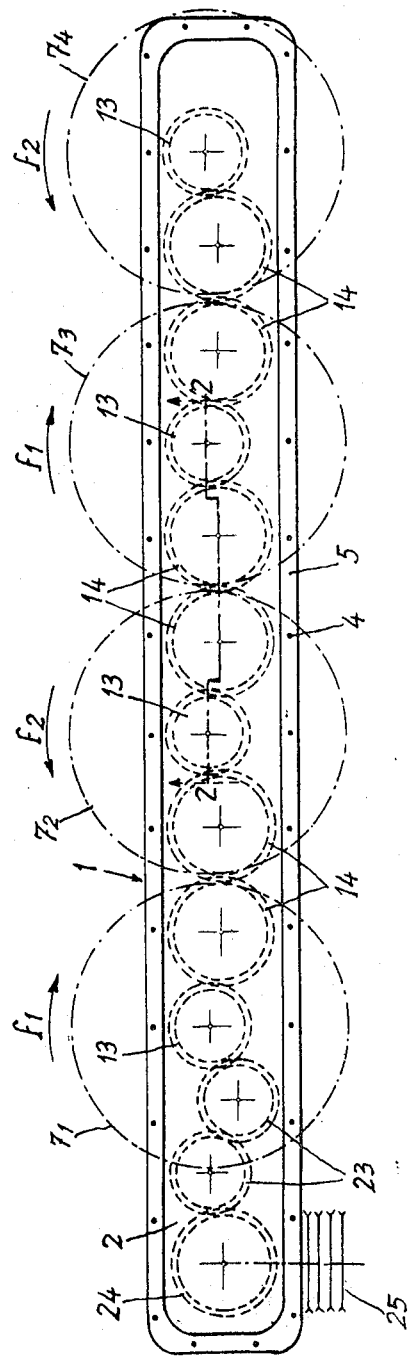
FIG. 1 is a diagrammatic plan view of the main bar of a rotary mowing machine which encloses a gear-type transmission mechanism for driving the cutter-supporting disc.
Figure 2:
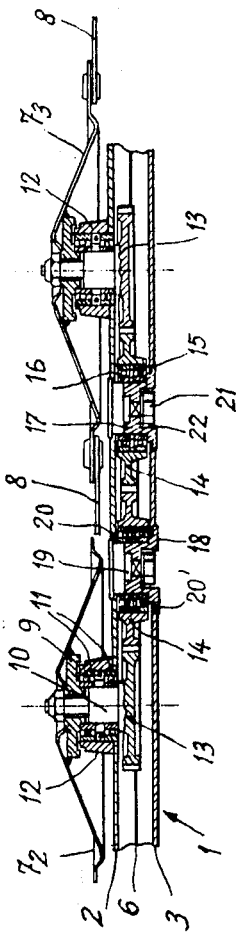
FIG. 2 is a longitudinal section taken along the line 2—2 of FIG. 1, showing a prior art the main bar portion carrying two supporting discs and a pair of intermediate toothed wheels.

Referring to FIGS. 1 and 2 it will be seen that the main bar 1 of a known rotary mowing machine is comprised of a case consisting of two similar sections or shells of pressed steel plate, i.e. an upper section 2 and a lower section 3 assembled by means of bolts 4 so as to clamp their marginal flanges 5 face which a gasket 6 is interposed. Discs $7_1$ to $7_4$ supporting cutter elements 8 are rigidly assembled to driving members 9 secured to spindles 10 journaled in bearings 11 fitted in rigid blocks 12 secured to the upper section 2 of the case.

If the transmission is of the gear type each spindle 10 carries within the case a driving pinion 13 which, for reasons to be explained presently, is located as close as possible to the inner wall face of the wall of the upper section 2 of the transmission case. Each pinion 13 meshes with at least one toothed wheel 14 of a couple of intermediate or reversing gears disposed on the median axis of the transmission case between the pinions 13 of two adjacent discs. Each toothed wheel or gear 14 is mounted on the outer races 15 of ball bearings having their inner races 16 mounted on supporting blocks 17 extending through an aperture 18 formed in the lower section 3 of the case so as to react thereagainst. A pin 19, having an upper portion clamped against a shoulder 20 of the upper case section 2 and forming a plug fitting in an inner bearing race 16, is threaded at its end and is adapted to secure the bearing block 17, by means of a nut 21 and a washer 22, to said upper section while clamping same against a shoulder 20' of the lower case section 3.

A couple of toothed wheels 23 having their axes offset in relation to the median or centerline of the case is mounted in this case between the pinion 13 driving the first supporting disc $7_1$ and the main driving pinion 24 rigid with the mower driving member 25.

In the form of embodiment illustrated in FIGS. 1 and 2 the machining of the lower portion or section of the case is rather complicated due to the necessity of forming therein bores for the passage of the bearing blocks and shoulders. Under these conditions and due to the relatively accurate and strict tolerances, the replacement of the lower case section alone cannot be contemplated.

Figure 5:
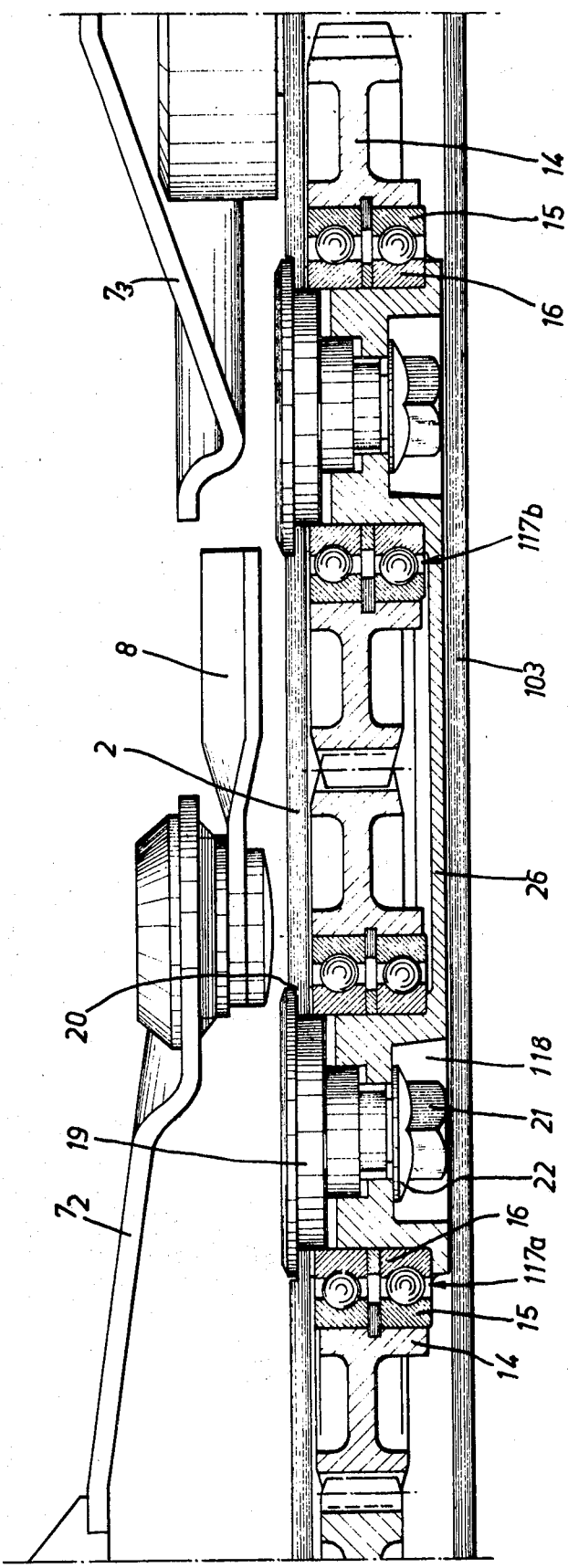
FIG. 5 is a longitudinal section also taken on a larger scale along the line 5—5 of FIG. 3.

In the form of embodiment of the present invention which is illustrated in FIGS. 3 to 5 inclusive of the drawing a reinforcing plate 26 of substantially rectangular configuration interconnects the lower ends of the bearing blocks 117a and 117b of two intermediate toothed wheels 14 of a gear couple. This reinforcement plate acts as a bridge piece to which said bearing blocks are rigidly assembled; if desired, this bridge piece may also bear against the wall formed without apertures of the lower case section 103. Apertures 118 formed in plate 26 are coaxial with the recess in the bearing blocks 117a and 117b so as to accommodate the nuts 21 of pins 19 securing these blocks. Another similar reinforcing plate is disposed in the same manner between the bearing blocks of the other toothed wheels 23.

These reinforcing plates are as flat and thin as possible in order to avoid any undue increment in the vertical dimension of the transmission case, in order to keep the cutting height at the minimum possible value; these plates are secured to the lower face of the bearing blocks by welding or any other suitable means, or cast integrally with said blocks. By interconnecting the bearing blocks of adjacent wheels they also rigidly assemble with one another the studs provided for fastening these blocks, so as to reinforce considerably the transmission mechanism in the case.

In the alternate form of embodiment shown in FIG. 6, the reinforcing plate 28 is elongated and interconnects all the bearing blocks 117a and 117b of all the intermediate or reversing wheels 14 and 23. Under these conditions it is also possible to interconnect only certain groups of bearing blocks.

In another modified form of embodiment illustrated in FIG. 7 the reinforcing plate associated with a pair of adjacent bearing blocks is widened to constitute a substantially prism or diamond-shaped plate 29 secured to the upper section 2 of the case at two opposite points by means of screws 30 or any other suitable and detachable fastening means.

In the embodiment described hereinabove and illustrated in FIG. 5 the lower section 103 of the case is rendered independent of the upper section 2 and can easily be replaced in case of wear, without interfering with the upper section.

If the disc drive is through a gear transmission as in the above-described arrangements, it is not sufficient to rigidly mount the toothed wheels and pinions to the upper section of the main bar, for it is also necessary to either avoid any distortion of this bar or eliminating the effect of this distortion.

Now it is not possible to avoid this distortion completely, especially when the main bar of the mowing machine is raised in the horizontal position by the inner shoe secured to the case end adjacent the main driving pinion 24. In fact, a downward deflection of the bar is unavoidable in this case due to the considerable overhang.

To avoid the jamming of the gear teeth which is likely to be caused by this distortion, a relatively large clearance must be provided between the intermeshing teeth, unless this distortion is prevented by using adequate means.

This last solution may advantageously consist in providing an asymmetrical arrangement of the disc-driving pinions 13 and intermediate or reversing toothed wheels 14 and 23 with respect to the neutral axis of the case, and notably upwards, this arrangement being illustrated in FIGS. 2, 4 and 5. In this case, the downward flexion of the main bar will increase the clearance between the wheels disposed above the neutral axis, in the area where a tension or stress is produced.

We claim:

1. A device for driving the cutter elements of a rotary mowing machine comprising a caselike main bar consisting of assembled upper and lower sections, a machine driving member rigid with a main driving pinion and supported by the upper section of the bar, bearing blocks secured on the upper section of said bar, bearings fitted in said blocks, spindles journaled in said bearings and projecting outside of the bar, discs supported by the upper portion of said spindles, cutting elements supported by said discs, a gear-type transmission comprising driving pinions carried by the lower portion of said spindles and toothed intermediate wheels between the driving pinions, said pinions and wheels being enclosed in said bar, ball-bearing blocks inside said bar supporting said intermediate wheels and pins securing said blocks to the upper part of said bar, the device further comprising flat bridge pieces rigidly secured to bearing blocks of at least two intermediate wheels, said bridge pieces interconnecting the lower ends of said bearing blocks and adapted to reinforce said transmission mechanism by rigidly assembling said fastening pins securing the bridge to the upper section of said bar.

2. A device according to claim 1, wherein said bridge piece interconnecting the bearing blocks of a pair of intermediate wheels has substantially the shape of a rectangular plate.

3. A device according to claim 2, wherein said bridge piece is welded to the lower faces of said intermediate wheels bearing blocks.

4. A device according to claim 2, wherein said bridge piece is molded integrally with said bearing blocks.

5. A device according to claim 2, wherein said bridge piece has substantially the shape of a diamond and is secured by means of screws in two opposite points to the upper section of said bar.

6. A device according to claim 1, wherein said bridge piece interconnects the bearing blocks of a group of intermediate wheels.

7. A device according to claim 1, wherein said disc driving pinions and said intermediate wheels enclosed in said caselike bar are disposed asymmetrically therein in relation to the neutral axis of said case, said pinions and wheels being located as close as possible to the inner face of the wall of the upper bar section.